United States Patent [19]

Shen et al.

[11] Patent Number: 6,122,411

[45] Date of Patent: Sep. 19, 2000

[54] METHOD AND APPARATUS FOR STORING HIGH AND LOW RESOLUTION IMAGES IN AN IMAGING DEVICE

[75] Inventors: David W. Shen, Cupertino; Lisa D. Holzhauser, San Jose; Amanda Ropa, Menlo Park, all of Calif.

[73] Assignee: Apple Computer, Inc., Cupertino, Calif.

[21] Appl. No.: 08/195,676

[22] Filed: Feb. 16, 1994

[51] Int. Cl.[7] ....................................................... G06K 9/60
[52] U.S. Cl. ........................... 382/299; 382/305; 358/404
[58] Field of Search .................. 382/47, 58, 61, 382/65, 69, 299, 305, 312, 317, 321, 325; 358/404, 444, 451

[56] References Cited

U.S. PATENT DOCUMENTS

| | | | |
|---|---|---|---|
| 5,016,114 | 5/1991 | Sakata et al. | 358/404 |
| 5,105,284 | 4/1992 | Sakata et al. | 358/404 |
| 5,285,290 | 2/1994 | Sakai et al. | 358/404 |
| 5,754,192 | 5/1998 | Sugaya | 346/33 R |

*Primary Examiner*—Andrew W. Johns
*Attorney, Agent, or Firm*—Burns, Doane, Swecker & Mathis, L.L.P.

[57] ABSTRACT

A method and apparatus for automatically switching the resolution of an image stored in a memory when the memory can no longer store another image with the present resolution. A processor first determines the amount of available memory in the memory for storing image data. The resolution is then automatically switched from a high resolution to a low resolution when available memory is above a first predetermined level and below a second predetermined level.

10 Claims, 5 Drawing Sheets

| FIG. 1A | FIG. 1B | FIG. 1C |

METHOD AND APPARATUS FOR STORING HIGH AND LOW RESOLUTION IMAGES IN AN IMAGING DEVICE

FIELD OF THE DISCLOSURE

The present invention relates to an imaging device, and more particularly to a method and apparatus for automatically switching the resolution of an image stored in such a device, depending on the amount of available memory.

BACKGROUND OF THE DISCLOSURE

Advances in the field of solid state electronics have made possible the development of various devices for electronically recording and/or manipulating images. These devices use a solid state image sensor, such as a charge coupled device (CCD), to sense the image forming light and a separate recording medium to record and store the picture. One example of such a device is an electronic still camera The solid state image sensor is built into the camera and is located at the focal point of the camera lens, i.e., at the same location that film is located in a photographic camera. When the camera shutter is activated, light is focused by the lens onto the image sensor. Light is detected by discrete cells within the image sensor and the light energy is converted into an electrical charge within the cell. The amount of charge is a measure of the light energy absorbed by the cell. When an appropriate voltage is applied to the cell, the charge can be transferred out of the cell to where the charge can be recorded and stored.

In some image recording devices it is possible to store images with various resolution settings. The amount of information or data contained in the image produced by the solid state imaging device increases as the desired resolution increases. As a result, images taken at high resolution settings need more space in a storage device than pictures taken with a low resolution setting because of the extra image data. For example, high resolution images can take up to four times the amount of storage space needed for low resolution pictures.

In some prior art still electronic cameras, a manual resolution button is provided for manually changing the resolution of the camera from high to low or from low to high. Since the high and low resolution pictures are stored in the same memory means, there may occur a situation when there is not enough available memory in the memory means to store a high resolution picture but there is enough available memory in the memory means to store at least one low resolution picture. Of course, a user can manually change the resolution setting when this occurs. However, a user may forget that there is available space in the memory means for low resolution pictures after the camera indicates that a high resolution picture cannot be taken. In addition, it may not be convenient or even possible to switch from a high resolution setting to a low resolution setting during a fast sequence of taking pictures.

SUMMARY OF THE DISCLOSURE

It is an object of the present invention to overcome the problems cited above by introducing an apparatus for automatically changing the resolution setting of a image recording device without a user's physical action when the device can continue storing images with a different resolution even though there is no more space for high resolution images. By automatically switching the device from a high resolution to a low resolution, the confusion over whether another image can be stored is minimized. In addition, switching to the other resolution allows a user to seemlessly continue working until there is no more available memory left for storing any type of image.

According to one embodiment of the present invention, the imaging apparatus for forming an image has a plurality of resolution settings including at least a high resolution setting and a low resolution setting. An integrating optoelectronic imaging device produces a set of image signals for each image according to the resolution setting selected by a resolution selecting means. The image signals are then stored in a storing means wherein an image taken with a high resolution setting consumes more space in the memory means than an image taken with a low resolution setting. A calculating means then determines the available memory in the memory means. Finally, the imaging apparatus contains means for automatically changing the resolution setting from high to low when the available memory in the memory means is determined to be above a first predetermined level and below a second predetermined level.

According to another embodiment of the present invention, a method for handling different resolution images in an electronic imaging device is disclosed. First, the electronic imaging device determines the amount of available memory in a storing means for storing image data. The electronic imaging device is then automatically switched from a high resolution to a low resolution when available memory is above a first predetermined level and below a second predetermined level.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION OF THE PREFERRED EMBODIMENT

The present invention can be used to control the utilization of memory in any type of image recording and/or image manipulating device that is capable of storing plural images. To facilitate an understanding of the principles of the invention, it is explained in detail hereinafter with specific reference to its implementation in an electronic still camera. It will be appreciated, however, that this embodiment is merely exemplary of one of the types of image recording devices in which the memory control of the present invention can be employed.

Figures 1, 1A:
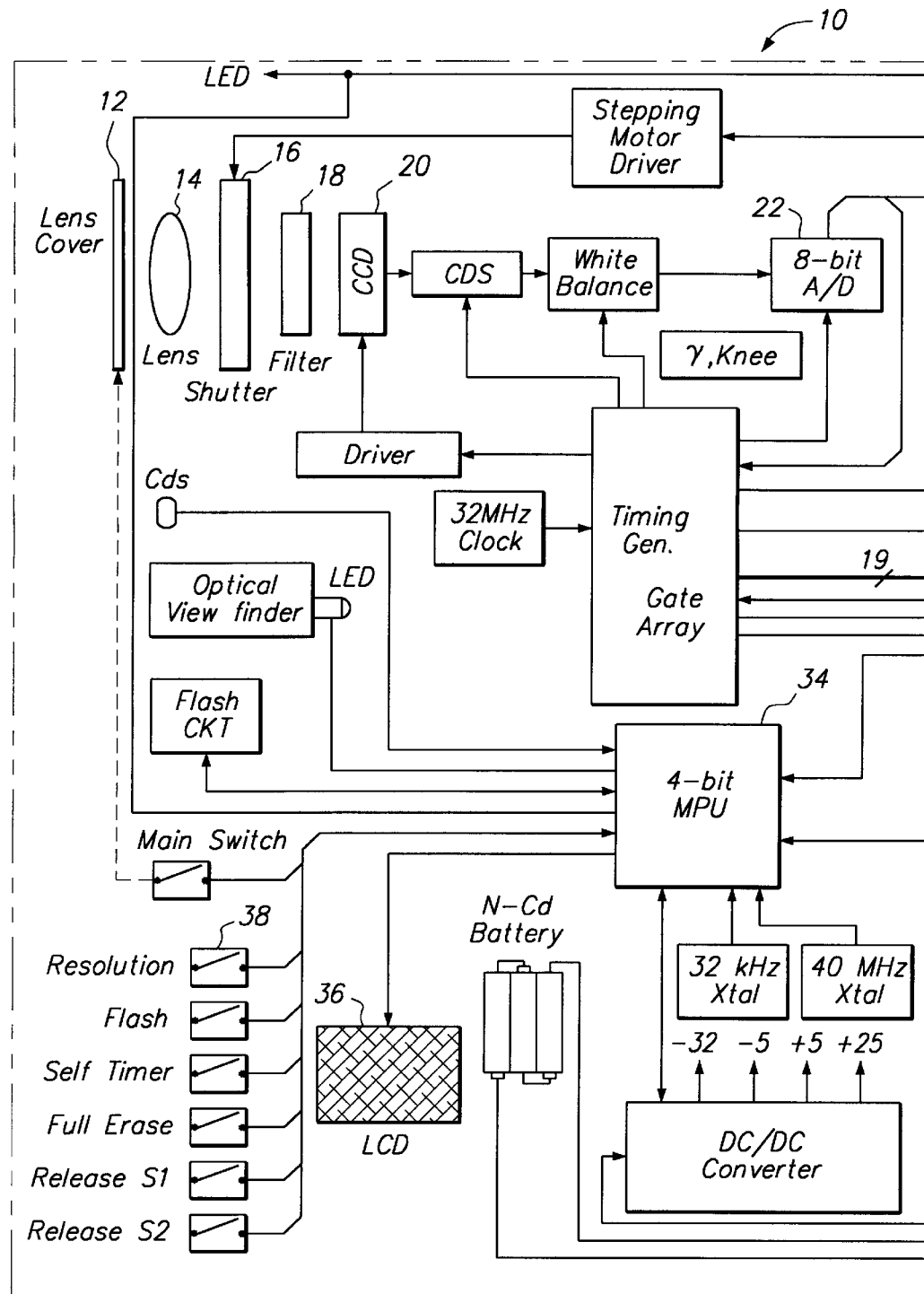
FIG. 1 illustrates a circuit block diagram of an electronic camera according to one embodiment of the present invention.
Figure 1B:
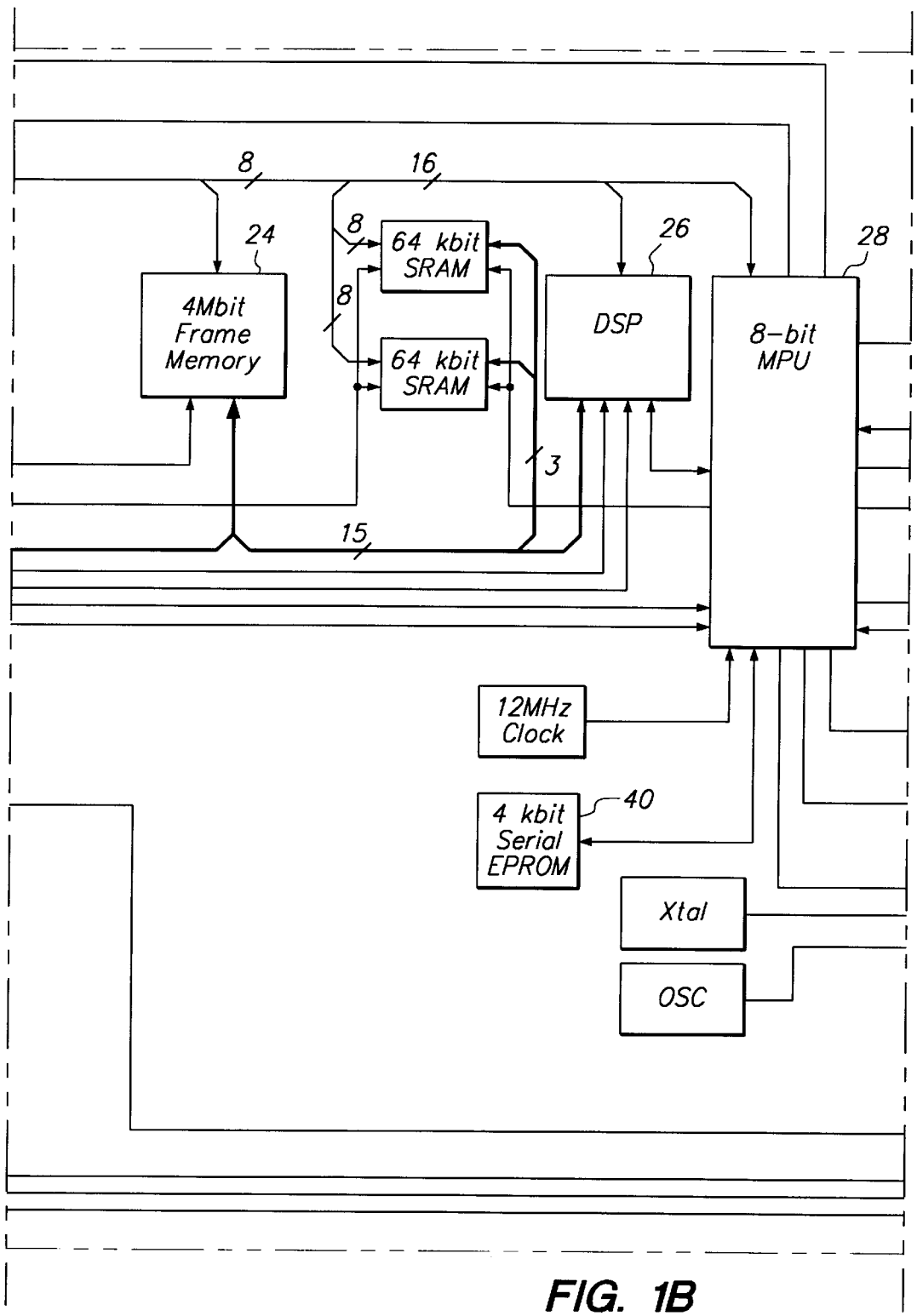
Figure 1C:
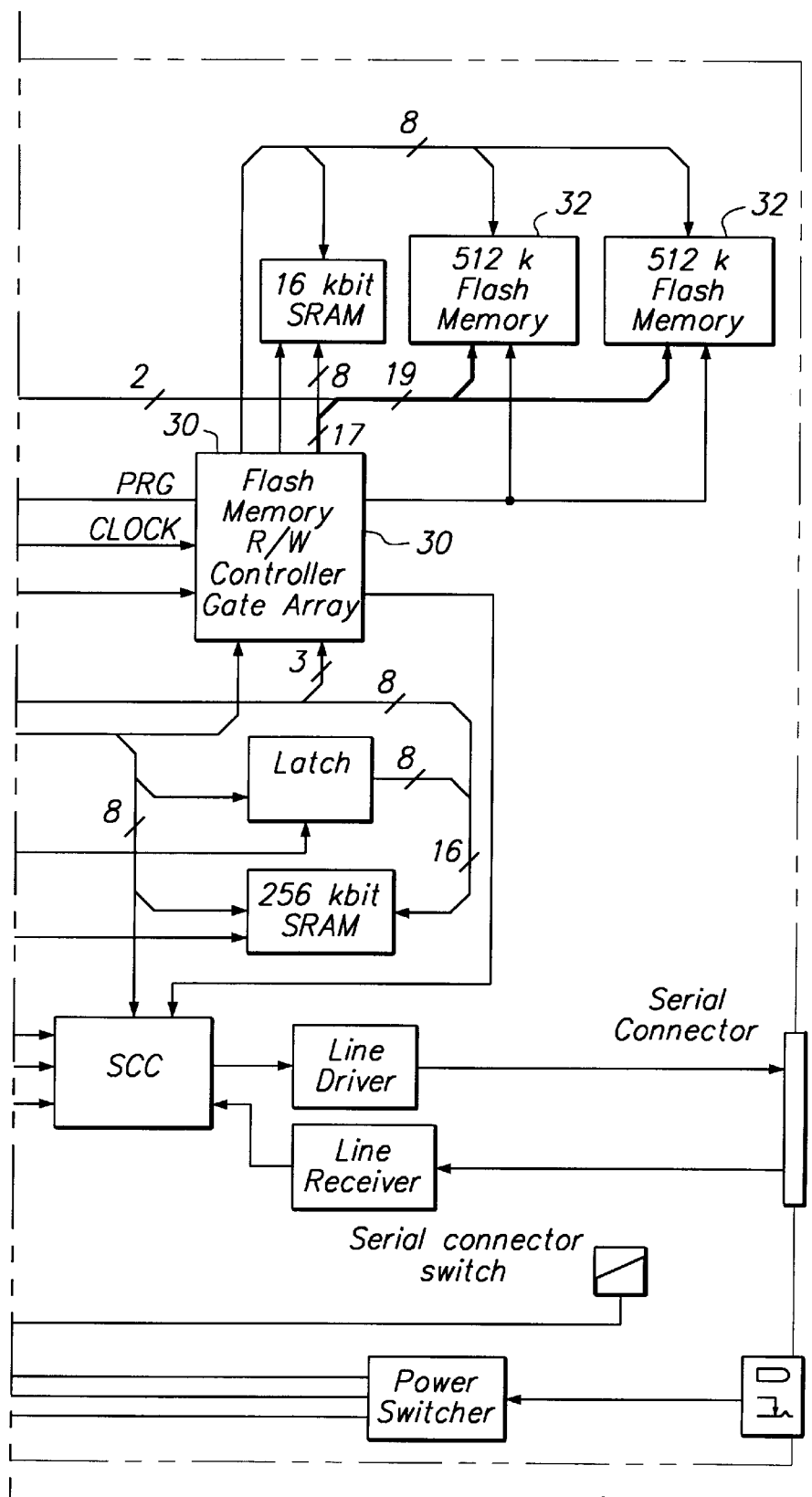

FIG. 1 illustrates a block diagram of an electronic camera according to one embodiment of the present invention. In this embodiment, the camera 10 is activated and turned on when the lens cover 12 is opened. When a picture is taken, light passes through the lens 14, the shutter 16 and the filter 18 and focuses on the charge coupled device (CCD) 20, which senses the image forming light. The image-forming light is detected by discrete cells within the CCD 20 and the light energy is converted into an electrical charge within the cell. The image formed in the CCD 20 is captured by the 8-bit A to D converter 22 which temporarily stores the image in the frame memory 24. The CCD image data is then processed by the digital signal processor DSP 26 so as to convert the raw CCD data into high or low resolution image data depending on the resolution setting of the camera which is usually indicated by a flag. The DSP 26 converts the CCD data into high or low resolution image data in a manner known in the art. The resolution image data produced by the DSP 26 is then stored in the flash memory means 32 by the 8-bit microprocessing unit 28 and the flash memory read/write controller 30. It will be understood by one of ordinary skill in the art that other types of memory means can be used to store the image data, such as an SRAM.

Figure 2:
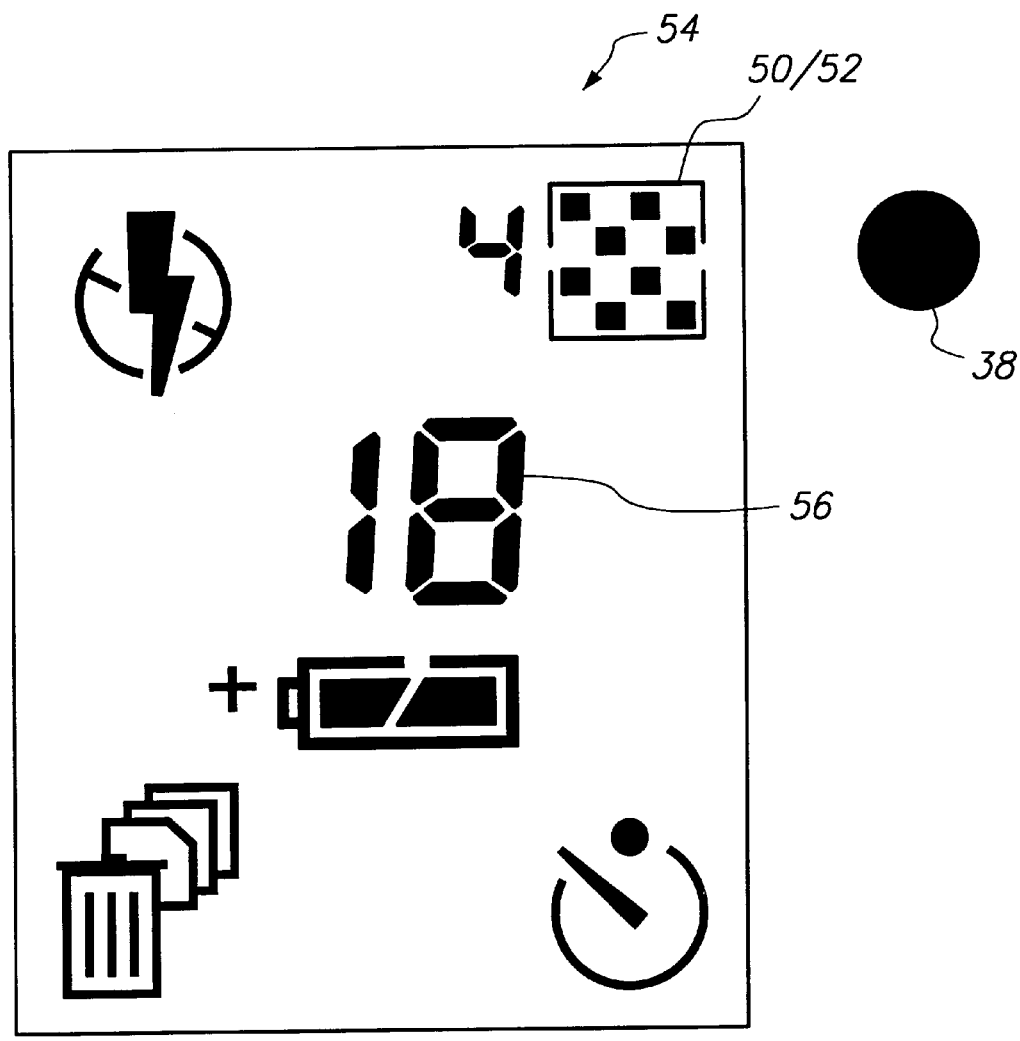
FIG. 2 illustrates a liquid crystal display (LCD) on the electronic camera according to one embodiment of the present invention.
Figure 3A:
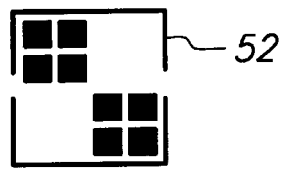
FIGS. 3(a)–(b) illustrates high and low resolution icons according to one embodiment of the present invention.
Figure 3B:
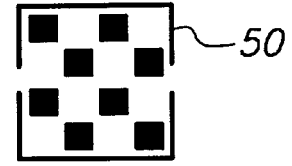

The camera 10 is provided with a resolution button 38 which toggles between two settings: a high resolution setting and a low resolution setting. The camera also includes an LCD display 36 for indicating various states associated with the operation of the camera. An example of such a display is shown in FIG. 2. As illustrated in FIG. 2, each resolution setting has a corresponding icon, which is displayed on the LCD 36, and a "memory available" display 54 which indicates how many images can still be taken in the selected resolution. As illustrated in FIGS. 3(*a*)–(*b*), the high resolution icon 50 is displayed when the camera is set for high resolution pictures and low resolution icon 52 is displayed when the camera is set for low resolution pictures. In addition, the LED 36 also displays the "Total Memory Used" 56. The number of pictures that can be taken in each resolution is stored in a 4-bit serial EPROM 40 which is connected to the 8-bit microprocessing unit 28. When the camera is turned on, the 8-bit microprocessing unit 28 recalls the number of pictures that can be taken as well as the total memory used from the EPROM 40 and passes this information to the 4-bit microprocessing unit 34 so that the 4-bit microprocessing unit 34 can display them on the LCD panel 36.

The main function of the 4-bit microprocessing unit 34 is to control the operation of the LCD 36 and a plurality of user buttons including the resolution button 38. When the high/low resolution button 38 is pressed, the 4-bit microprocessing unit sends a signal to the 8-bit microprocessing unit 28 that the camera should now use the corresponding selected resolution processing program. If the resolution button is pressed when the camera has a low resolution setting, the resolution setting changes to a high resolution setting, the high resolution icon is shown on the LCD 36 and the memory available display changes to reveal the number of high resolution images that can be stored in the remaining available memory. If the resolution button is pressed when the camera has a high resolution setting, the setting changes to a low resolution setting, the low resolution icon is shown in the LCD 36 and the memory available display changes to reveal the number of low resolution pictures that can be stored in the remaining available memory.

In the present embodiment, the flash memory 32 can store both high resolution pictures and low resolution pictures. As a result, any combination of high and low resolution pictures can be stored in the flash memory as long as space is available. In one embodiment of the present invention, the flash memory 32 can contain 8 high resolution pictures or 32 low resolution pictures. Since the flash memory can contain both high and low resolution pictures, a condition can exist in the camera where there is not enough memory left to take a high resolution picture but there is still enough available memory to store at least one low resolution picture. For example, the camera may be presently in a low resolution setting and the LCD display shows that 7 low resolution pictures are left. If the resolution button 38 is pressed to change the resolution mode from low to high, the LCD 36 will show that only one high resolution picture is left. After the high resolution picture is taken, another high resolution picture can not be taken since the available capacity in the flash memory 32 is not large enough to store another high resolution picture. However, in this example, there is still enough room in the flash memory 32 to store 3 low resolution pictures. In the present embodiment, the 4-bit microprocessing unit 34 detects this condition and automatically switches the resolution setting from high to low since there is available memory for low resolution pictures.

At this point, if the user presses the high low resolution button 38, the 4-bit microprocessing unit 34 will display "0" in the picture available display for a short period of time and then return to the low resolution mode. The 4-bit microprocessing unit 34 can perform this function because the microprocessing unit 34 keeps track of how many more pictures of each resolution can still be stored in the camera by incrementing a memory storage location which contains the total number of pictures after each picture is taken The microprocessing unit 34 can then compare the total number of pictures taken with a predetermined number to determine if another high or low resolution picture can be taken. As a result, a user can continue to take low resolution pictures until there is no more available memory. When there is no more available memory so that the user cannot take any more high or low resolution pictures, the 4-bit microprocessing unit 34 detects this condition and allows the user to remain in the current resolution setting while displaying "0" for images left.

Figure 4:
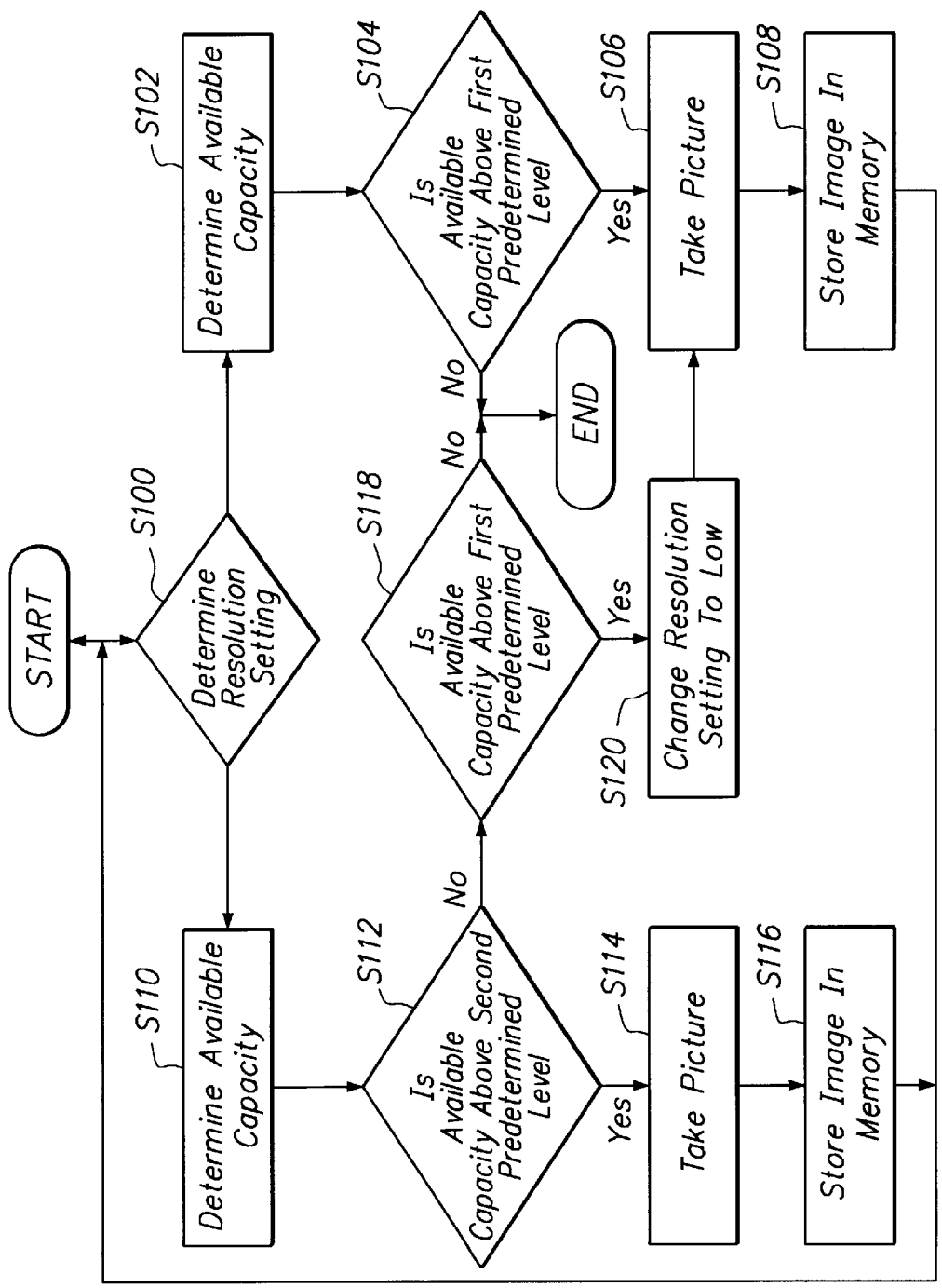
FIG. 4 illustrates a flowchart depicting the operation of an electronic camera according to one embodiment of the present invention.

FIG. 4 illustrates a flowchart describing one embodiment of the present invention. First, it is determined whether the camera is in a low resolution setting or in a high resolution setting in step S100. If the camera is in a low resolution setting, microprocessing unit 34 determines how much available memory remains in the flash memory in step S102. If the available memory is not above a first predetermined level, wherein the first predetermined level is the amount of memory needed for storing one low resolution image, in step S104, the camera is prevented from taking a picture since there is no available memory for storing the image. However, if it is determined that the available memory is above the first predetermined level, a picture can be taken in step S106 and the image can be stored in the memory in step S108.

When it is determined in step S100 that the camera is in a high resolution mode, the available capacity in the flash memory is determined by the microprocessing unit 34 in step S110. If the available capacity is above a second predetermined level, wherein the second predetermined level is the amount of memory needed for storing one high resolution image, as determined in step S112, a picture can be taken in step S114 in a high resolution mode and the image can be stored in the flash memory in step S116. However, if it is determined in step S112 that the available memory is below the second predetermined level, the camera determines whether the available memory is above the first predetermined level in step S118. If the available capacity is not above the first predetermined level, then a picture cannot be taken. However, if the available capacity is above the first predetermined level, the microprocessing unit 34 automatically switches the resolution setting of the camera from a high resolution to a low resolution in step S120. Then, a picture can be taken with a low resolution setting in step S106 and the image can be stored in the memory in S108.

Thus, the present invention allows a user to continue taking pictures and storing images until all of the available memory is full, without having to physically press the resolution button. In addition, a fast sequence of images can seemlessly be stored in a short period of time, even though there is no more space in the memory for high resolution images.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. An imaging apparatus for storing an image, said apparatus having a plurality of resolution settings including at least a high resolution setting and a low resolution setting, comprising:

resolution selecting means for selecting a resolution setting from the plurality of resolution settings;

an integrating opto-electronic imaging device for producing a set of image signals for each image according to the resolution settings;

means for storing the image signals, wherein a high resolution image takes up more space than a low resolution image;

means for determining the available memory in said storing means;

means for automatically changing the resolution setting from high to low when the available memory in the storing means is above a first predetermined level and below a second predetermined level, and display means for displaying at least the selected resolution setting and the number of images that can be further stored in said storing means for the selected resolution setting.

2. An imaging apparatus for storing an image according to claim 1, wherein said resolution setting is not automatically changed when there is insufficient available memory.

3. An imaging apparatus for storing an image according to claim 1, wherein both high resolution images and low resolution images are stored together in the storing means.

4. An imaging apparatus for storing an image according to claim 1, wherein said first predetermined level is equal to the amount of memory needed to store a single low resolution image and said second predetermined level is equal to the amount of memory needed to store a single high resolution image.

5. An imaging apparatus for storing an image according to claim 1, wherein an image can not be stored when the available memory is below said first predetermined level.

6. A method for handling different resolution images in an electronic imaging device having a plurality of resolution settings, comprising the steps of:

determining available memory in a memory means;

automatically switching the resolution of the imaging device from a high resolution to a low resolution when available memory is above a first predetermined level and below a second predetermined level;

forming an image with the selected resolution setting;

storing said image in said memory means; and displaying at least the selected resolution setting and the number of images that can be further stored in said memory means for the selected resolution setting.

7. A method according to claim 6, wherein said resolution setting is not automatically changed when there is no available memory.

8. A method according to claim 6, wherein both high resolution images and low resolution images are stored together in the memory means.

9. A method according to claim 6, wherein said first predetermined level is equal to the amount of memory needed to store a single low resolution image and said second predetermined level is equal to the amount of memory needed to store a single high resolution image.

10. A method according to claim 6, wherein an image can not be stored when the available memory is below said first predetermined level.

* * * * *